Feb. 2, 1926.  
A. BRADLEY  
1,571,787  
HAY STACKING FRAME  
Filed June 24, 1925
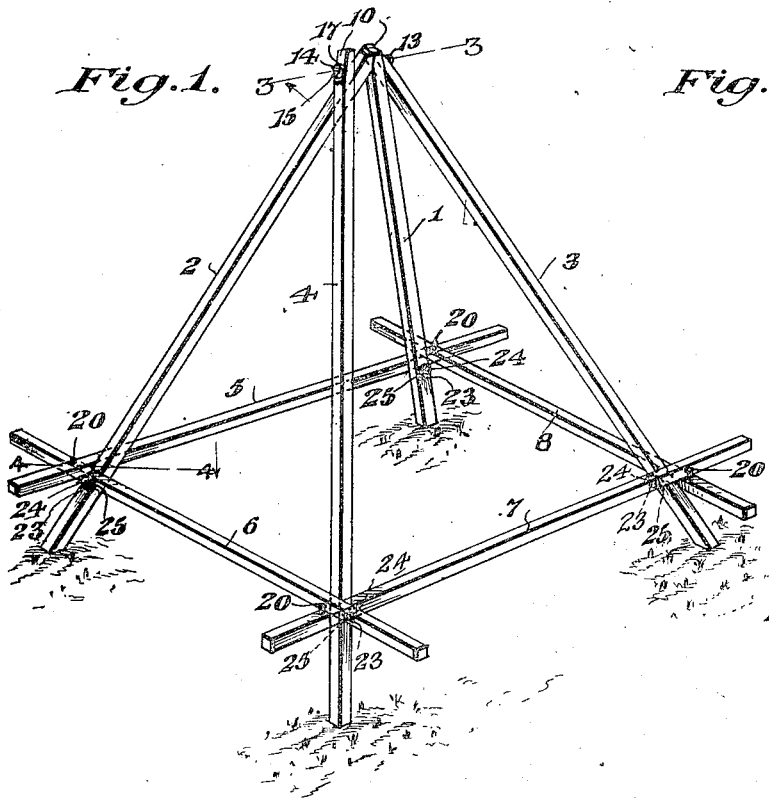
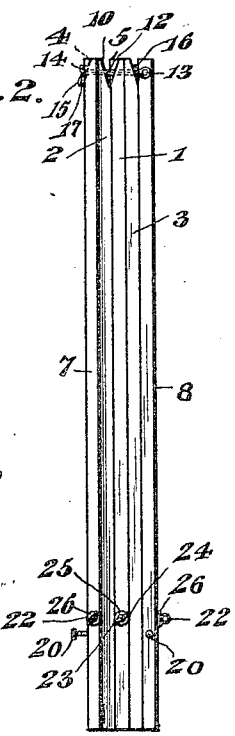
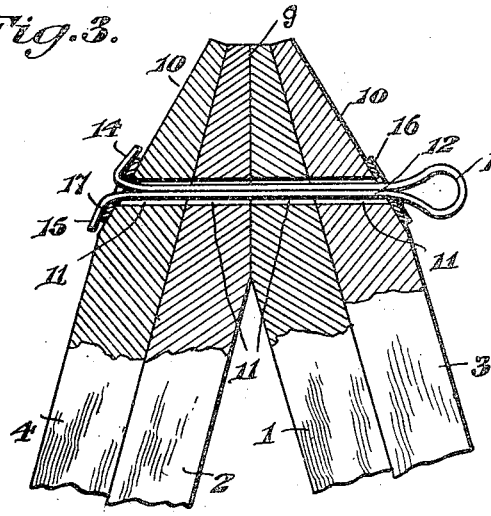
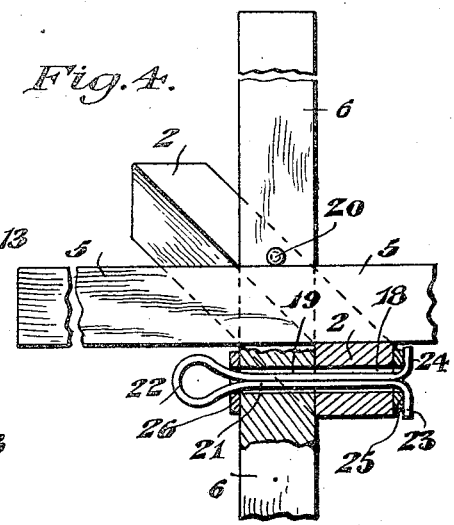
INVENTOR.  
Allen Bradley,  
BY  
Geo. F. Kimmel.  ATTORNEY.

Patented Feb. 2, 1926.

1,571,787

UNITED STATES PATENT OFFICE.

ALLEN BRADLEY, OF HERNDON, VIRGINIA.

HAY-STACKING FRAME.

Application filed June 24, 1925. Serial No. 39,293.

*To all whom it may concern:*

Be it known that I, ALLEN BRADLEY, a citizen of the United States, residing at Herndon, in the county of Fairfax and State of Virginia, have invented certain new and useful Improvements in Hay-Stacking Frames, of which the following is a specification.

This invention relates to a portable stacking frame, more particularly to a frame of the class especially adapted for supporting shocks or stacks of hay out of contact with the ground and in a manner to provide ventilation to facilitate the curing and drying of the hay, and the invention has for its object to provide, in a manner as hereinafter referred to, a portable stacking frame for the purpose referred to, which is very simple and inexpensive in construction and in which the several parts are so combined and formed that the frame can be quickly collapsed and folded up, substantially flat-wise, to permit of a number of frames being stored up in a compact space, and further in which the elements of the frame are so arranged whereby the frame can be quickly set up in the field at the desired point and sustained without the necessity of driving the supporting ends thereof into the ground, as in the common way for fastening stacker poles.

Further objects of the invention are to provide, in a manner as hereinafter set forth, a portable hay stacking frame, which is foldable compactly when not in use, strong, durable, thoroughly efficient in its use, conveniently extended to stack supporting position, and inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a perspective view of a portable hay stacking frame, in accordance with this invention, when extended to stack supporting position.

Figure 2 is an elevation of the frame when folded.

Figure 3 is a fragmentary view on line 3—3, Figure 1.

Figure 4 is a fragmentary view partly in section and in elevation illustrating one of the supporting bars and a pair of brace bars.

A hay stacking frame, in accordance with this invention, when extended, is pyramidal in contour, as shown in Figure 1, and said frame includes four supporting bars, indicated at 1, 2, 3 and 4 and which are of equal length and the length of said bars can be as desired. The frame further includes four brace bars 5, 6, 7 and 8.

The upper end terminal portion of the inner side edge of the bars 1 and 2 is bevelled, as indicated at 9 in Figure 3, whereby when the supporting bars are extended in an upright position the bevelled portions of the bars 1, 2 will abut. The bevelling of the bars 1, 2, provides said bars with upper end terminal portions of reduced thickness. The bars 3 and 4 have their upper end terminal portions of reduced thickness and which are provided by bevelling the outer sides of the bars 3, 4, at the upper terminal portions thereof, as indicated at 10. The bars 1, 2, 3 and 4, at their reduced upper end terminal portions, are formed with registering openings, as indicated at 11, and said registering openings 11 are provided for the passage of suitable means for pivotally and loosely connecting the said upper terminal portions of said bars together. Any means can be employed for such purpose, and by way of example, there is illustrated a substantially elongated cotter pin 12 formed with a head 13 and a pair of angle-shaped end portions 14, 15, extending in opposite directions with respect to each other. A washer 16 is positioned against the bevelled portion 10 of the bar 3, and a washer 17 is positioned against the bevelled portion 10 of the bar 4. The cotter pin 12 extends through said washers and the washer 16 is interposed between the bar 3 and the head 13, and the washer 17 is interposed between the angular end portions 14 and 15 and the bar 4.

When the bars 1, 2, 3 and 4 are connected together by the cotter pin 12, the upper ends of the bars 1, 2 are arranged between the upper ends of the bars 3, 4. The inner side of the bar 3 rides against the upper end of the outer side of the bar 1, and the inner side of the bar 4 rides against the outer side of the bar 2. The bars 1 and 3, when the frame is set up, are disposed at an inclination and extend in opposite directions with respect to each other, and a like arrangement is had with respect to the bars 2, 4. When the frame is set up, the bars 1 and 2 extend at an inclination and in an opposite direction with respect to each other, and a like arrangement is had with respect to the bars 3, 4. When the frame is set up or extended, the bars 1, 2 are shifted relatively to each other so that the lower portions thereof will extend away from each other whereby the bevelled portions 9 will abut, see Figure 3.

Each of the bars 1, 2, 3 and 4, at a point between its transverse center and lower end, is provided with a transverse opening 18. See Figure 4. The opening 18 in the bar 1 extends at right angles with respect to the opening 18 in the bar 2. The opening 18 in the bar 2 extends at right angles with respect to the opening 18 in the bar 4. The opening 18 in the bar 4 extends at right angles with respect to the opening 18 in the bar 3, and the opening 18 in the bar 3 extends at right angles with respect to the opening 18 in the bar 1.

Each of the brace bars 5, 6, 7 and 8 is provided with a transverse opening 19 as shown in Figure 4. The opening 19 in the bar 5 extends at right angles with respect to the opening 19 in the bar 6. The opening 19 in the bar 6 extends at right angles with respect to the opening 19 in the bar 7. The opening 19 in the bar 7 extends at right angles with respect to the opening 19 in the bar 8, and the opening 19 in the latter extends at right angles with respect to the opening 19 in the bar 5. The openings 18 in the supporting bars register with the openings 19 in the brace bars, and said registering openings are provided for the passage of means for pivotally connecting the brace bars to the supporting bars. The bar 5 is pivotally connected in proximity to one end to the bar 1. The bar 6 is pivotally connected in proximity to one end to the bar 2. The bar 7 is pivotally connected in proximity to one end to the bar 4, and the bar 8 is pivotally connected in proximity to one end to the bar 3. The brace bars are of equal length and can be of any length desired. The top edge of each of the brace bars, in proximity to the end opposite the end thereof which is pivoted, is provided with a vertically disposed stop 20 for a purpose to be presently referred to.

Any suitable means can be employed for pivotally connecting the brace bars to the supporting bars and as illustrated by way of example, a cotter pin 21 is extended through each pair of registering openings 18, 19 and includes a head 22 and a pair of oppositely extending angularly disposed end portions 23, 24. Interposed between the end portions 23 and 24 and a supporting bar is a washer 25, through which extends the cotter pin 21. Interposed between the head 22 and a brace bar is a washer 26 through which extends the cotter pin 21. See Figure 4.

The brace bars are of a length to project from the supporting bars when the frame is set up in stack supporting position, see Figure 1, and the free end of the brace bar 5 is supported upon the pivoted end of the brace bar 6 and abuts against the supporting bar 2 and is maintained in position against said bar 2 by the stop 20 carried by the brace bar 6. The brace bar 6 is supported upon the pivoted end of the brace bar 7 exteriorly of and abuts against the supporting bar 4 and is maintained in position by the stop 20 on the brace bar 7. The brace bar 7 is mounted on the pivoted end of the brace bar 8 exteriorly of the supporting bar 3 and is maintained against said supporting bar 3 by the stop 20 on the brace bar 8. The brace bar 8 is mounted on the pivoted end of the brace bar 5 exteriorly of the supporting bar 1 and is maintained against said bar 1 by the stop 20 on the brace bar 5.

When the frame is folded, the bars 1 and 2 abut lengthwise. The bar 3 abuts against the bar 1, and the bar 4 abuts against the bar 2. See Figure 2. The bar 5 abuts against the bar 1 lengthwise thereof. The bar 8 abuts against the bar 3 lengthwise thereof. The bar 7 abuts against the bar 4 lengthwise thereof, and the bar 6 abuts against the bar 2 lengthwise thereof. See Figure 2 with respect to the folded position of the bars 5, 7 and 8. The bar 6 is at the back of the bar 2 when folded in the position shown in Figure 2, therefore, the bar 6 is not illustrated.

The brace bars not only provide means for maintaining the supporting bars in extended position, but also act as supporting means for each other and carry stops so that the brace bars will be retained in bracing and suspending position for the supporting bars. The brace bars are arranged, when the frame is extended, to stack supporting position, a sufficient distance above the ground to permit air to freely circulate beneath the stack to facilitate the curing and drying of the hay.

The construction and arrangement of the elements of the stacking frame are such that the frame can be quickly extended and folded when occasion requires, and further when collapsed folded in a compact manner requiring but little storage space.

It is thought that the many advantages of a portable hay stacking frame, in accordance with this invention, can be readily understood, and although the preferred embodiment of the invention is as illustrated and described, yet it is to be understood that changes in the details of construction can be had which will fall within the scope of the invention as claimed.

What I claim is:—

1. A foldable hay stacking frame comprising two pair of upstanding foldable supporting bars extendible at an inclination to the vertical, and pivotally connected together at their upper ends, a foldable brace bar pivotally connected at a point in proximity to one end thereof to a supporting bar in proximity to the lower end of the latter and shiftable to extend horizontally when the supporting bar is extended, said brace bars arranged exteriorly of the supporting bars and of a length to project laterally therefrom when the supporting bars are extended, each of said brace bars when shifted to a horizontal position having its free end seating on and supported by the pivoted end of an adjacent brace bar, and means carried by said brace bars for maintaining the non-pivoted ends thereof against the supporting bars when these latter are extended.

2. A foldable hay stacking frame comprising two pair of upstanding foldable supporting bars extendible at an inclination to the vertical, means common to said bars and extending through the upper end portions thereof for slidably and pivotally connecting said end portions together, brace bar pivoted at one end to said supporting bars, and means carried by said brace bars for maintaining the non-pivoted ends thereof against the supporting bars when these latter are extended, one pair of supporting bars arranged between the bars of the other pair and having the inner sides at the upper end terminals thereof beveled.

3. A foldable hay stacking frame comprising two pair of upstanding foldable supporting bars extendible at an inclination to the vertical and pivotally connected together at their upper ends, a foldable brace bar pivotally connected at a point in proximity to one end thereof to a supporting bar in proximity to the lower end of the latter and shiftable to extend horizontally when the supporting bar is extended, said brace bars arranged exteriorly of the supporting bars and of a length to project laterally therefrom when the supporting bars are extended, each of said brace bars when shifted to a horizontal position having its free end seating on and supported by the pivoted end of an adjacent brace bar.

In testimony whereof, I affix my signature hereto.

ALLEN BRADLEY.